US008893505B2

(12) United States Patent
Mokheimer et al.

(10) Patent No.: US 8,893,505 B2
(45) Date of Patent: Nov. 25, 2014

(54) INTEGRATED SOLAR-GAS TURBINE COGENERATION PLANT

(75) Inventors: Esmail M. A. Mokheimer, Dhahran (SA); Mohamed Abdel-Aziz Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 438 days.

(21) Appl. No.: 13/369,234

(22) Filed: Feb. 8, 2012

(65) Prior Publication Data

US 2012/0131898 A1  May 31, 2012

(51) Int. Cl.
| | |
|---|---|
| *F02C 7/08* | (2006.01) |
| *F02C 3/28* | (2006.01) |
| *F03G 6/04* | (2006.01) |
| *F02C 1/05* | (2006.01) |
| *F02C 6/14* | (2006.01) |
| *F02C 6/18* | (2006.01) |
| *C01B 3/34* | (2006.01) |
| *C01B 3/48* | (2006.01) |
| *F03G 6/06* | (2006.01) |

(52) U.S. Cl.
CPC ... *F02C 1/05* (2013.01); *F02C 6/14* (2013.01); *F02C 6/18* (2013.01); *F02C 7/08* (2013.01); *C01B 3/34* (2013.01); *C01B 3/48* (2013.01); *F03G 6/04* (2013.01); *F03G 6/06* (2013.01); *C01B 2203/0233* (2013.01); *C01B 2203/0283* (2013.01); *C01B 2203/043* (2013.01); *C01B 2203/0475* (2013.01); *C01B 2203/0811* (2013.01); *C01B 2203/0827* (2013.01); *C01B 2203/84* (2013.01); *C01B 2203/86* (2013.01); *Y02E 10/46* (2013.01); *Y02E 20/14* (2013.01)
USPC ...... 60/780; 60/39.12; 60/39.511; 60/39.181; 60/641.8; 60/641.15

(58) Field of Classification Search
USPC ........... 60/641.8, 641.15, 783, 801, 780, 781, 60/39.12, 39.511, 39.181
See application file for complete search history.

(56) References Cited

U.S. PATENT DOCUMENTS

| | | | | |
|---|---|---|---|---|
| 4,167,856 | A | * | 9/1979 | Seidel et al. ............... 60/641.14 |
| 5,417,052 | A | * | 5/1995 | Bharathan et al. ............... 60/783 |

(Continued)

FOREIGN PATENT DOCUMENTS

| | | |
|---|---|---|
| DE | 39 33 285 A1 | 4/1991 |
| JP | 2005-206404 A | 8/2005 |
| WO | WO 2011/061764 A1 | 5/2011 |

OTHER PUBLICATIONS

"Dynamics of a solar thermo chemical reactor for steam-reforming of methane", Petrasch et al., Aldo, Chemical Engineering Science 62 (2007) 4214-4228.

*Primary Examiner* — Phutthiwat Wongwian
*Assistant Examiner* — Steven Sutherland
(74) *Attorney, Agent, or Firm* — Richard C. Litman

(57) ABSTRACT

The integrated solar-gas turbine cogeneration plant includes a fuel reformer, a plurality of solar collectors, and a gas turbine. The fuel reformer produces syngas to be used as fuel for the gas turbine. One solar collector is operatively connected to both the fuel reformer and the turbine to provide heat for the reforming reaction and to preheat air for a combustion chamber. Exhaust gas from the turbine is directed to the fuel reformer and to a heat recovery steam generator, the former as an additional heat source and the latter to heat the generator. Another solar collector is connected to the generator and heats a portion of the water being fed into the generator in order to help produce steam. The syngas is stored in a fuel storage unit to provide fuel to the gas turbine continuously and to a supplemental heater on the steam generator during low insolation periods.

6 Claims, 1 Drawing Sheet

(56) References Cited

U.S. PATENT DOCUMENTS

| | | | |
|---|---|---|---|
| 5,444,972 A * | 8/1995 | Moore | 60/39.182 |
| 5,727,379 A * | 3/1998 | Cohn | 60/39.182 |
| 5,806,317 A * | 9/1998 | Kohler et al. | 60/659 |
| 6,767,530 B2 | 7/2004 | Kobayashi et al. | |
| 6,832,485 B2 | 12/2004 | Sugarmen et al. | |
| 7,537,750 B2 | 5/2009 | Litwin et al. | |
| 8,327,641 B2 * | 12/2012 | Freund et al. | 60/641.8 |
| 2007/0157614 A1 * | 7/2007 | Goldman | 60/641.15 |
| 2010/0249468 A1 | 9/2010 | Perkins et al. | |

* cited by examiner

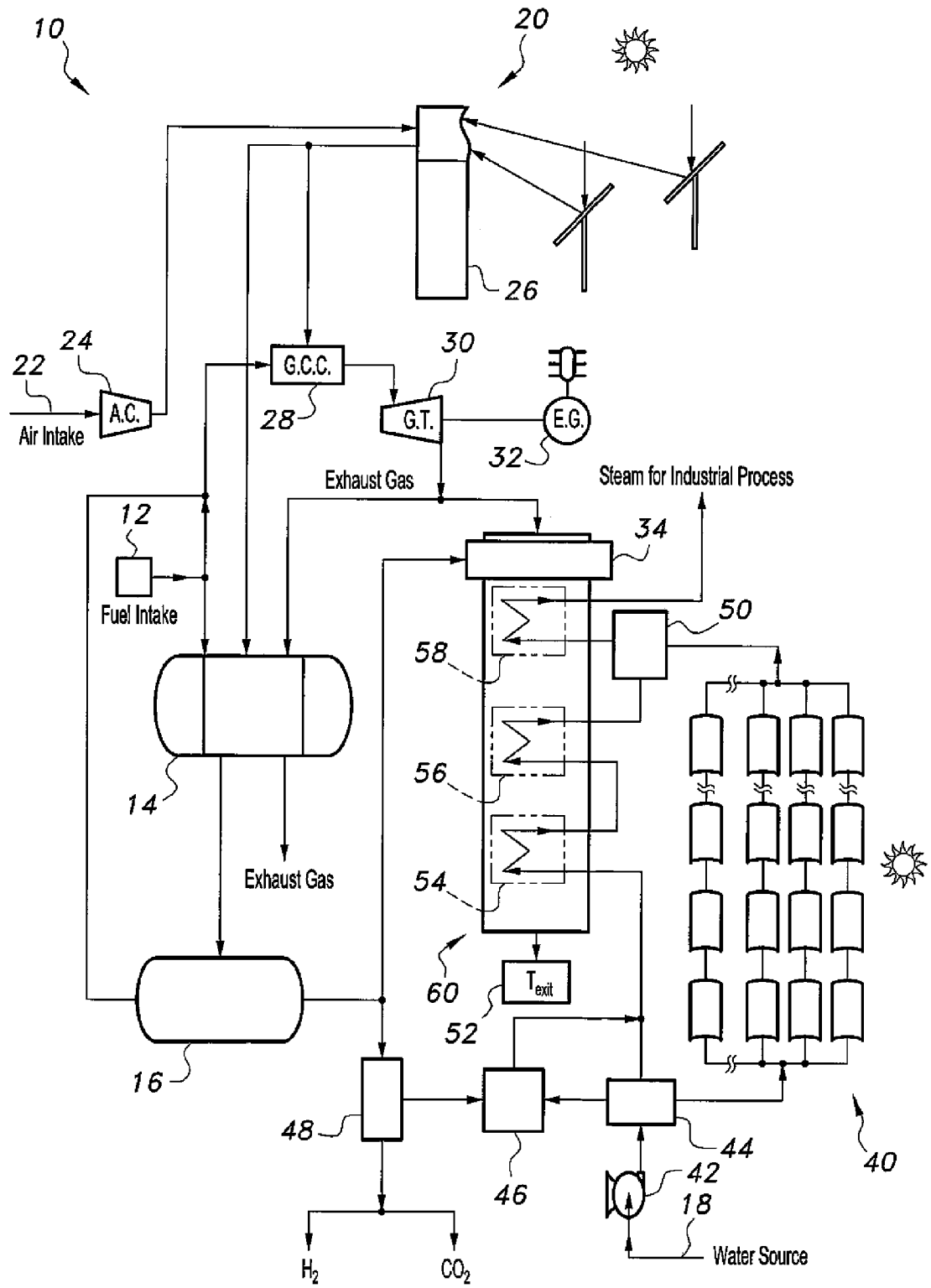

INTEGRATED SOLAR-GAS TURBINE COGENERATION PLANT

BACKGROUND OF THE INVENTION

1. Field of the Invention

The present invention relates to power generation systems, and particularly to an integrated solar-gas turbine cogeneration plant that produces power efficiently and economically with minimal impact on the environment.

2. Description of the Related Art

Energy consumption and carbon dioxide emissions have become an increasing concern in the power and steam generation industry. A typical power plant using fossil fuels can produce tons of waste products such as carbon dioxide on an annual basis, even with strict regulation. Moreover, important factors, such as the balance between energy input and output for producing the power and the economics thereof, must be carefully considered and monitored in order to sustain a profitable and efficient power plant.

Several different methods have been pursued in order to confront this problem. One solution lies in cogeneration. Cogeneration is the sequential production of electricity and heat, steam, or useful work from the same fuel source. It can be applied to any commercial, industrial, or institutional facility where there is a simultaneous need for both heat energy and electrical power. It offers several advantages over central electricity generating stations. Many of these advantages have been noted through energy and exergy analyses of cogeneration systems. Among these advantages are higher fuel efficiency, reduced operational costs and self-sustaining plant operation. Fuel efficiency is increased because the normally rejected heat, e.g., the excess heat from combusting fossil fuel, is used in other useful processes, such as hot water heating. Due to the increased efficiency, the amount of fuel and the costs thereof are lower than in a typical fossil fuel power plant, which equates to a more financially attractive operation. The power or electricity produced through cogeneration is often used to power the plant, which substantially reduces transmission line capacity and costs. Moreover, unlike central power generating stations, cogeneration can be cost-effective even in very small capacities, e.g., as low as 50 to 100 kW. Furthermore, most cogeneration projects have a much shorter lead time than the large central generating stations.

Another emerging method includes integration of solar concentration technologies with cogeneration gas turbine power/steam generation technologies, especially for large-scale applications. The conversion of cogeneration plants that are based on gas turbine cycles to integrated solar cogeneration gas turbine cycles (ISCGC) begins with adding an additional source of heat, such as solar energy, to reduce fossil fuel (e.g., natural gas) consumption, and thereby improves overall plant efficiency and reduces greenhouse gas emission, as well as other environmental pollution associated with the combustion of fossil fuels. There are other advantages of such a system, even when compared with stand-alone concentrated solar power (CSP) plants, which need the addition of expensive, bulky energy storage systems. For example, the ISCGC uses existing components, such as steam generators, a steam turbine, and a condensing system, which results in reduced installation costs of a typical CSP system. Concentration solar cogeneration power plants (CSCPP) have been shown to provide a key solution for the pressing freshwater deficits in the Middle East and North Africa (MENA) region, and could be used in the future for exporting electricity to Europe.

While the above provides some efficient and economic alternatives to the conventional fossil fuel and/or central power plants, there is still a need to increase productivity and efficiency in such systems. Thus, an integrated solar-gas turbine cogeneration plant solving the aforementioned problems is desired.

SUMMARY OF THE INVENTION

The integrated solar-gas turbine cogeneration plant includes a fuel reformer, a plurality of solar collectors, and a gas turbine. The fuel reformer produces syngas to be used as fuel for the gas turbine. One of the solar collectors is operatively connected to both the fuel reformer and the turbine, to provide heat for the reforming reaction and to preheat air for a combustion chamber. Exhaust gas from the turbine is directed to the fuel reformer and to a heat recovery steam generator, the former as an optional or additional heat source, and the latter to heat the generator. The other solar collector is operatively connected to the steam generator. This solar collector heats a portion of the water being fed into the steam generator in order to help produce steam for industrial processes, including heating and providing a steam source for the reformer. The syngas is stored in a fuel storage to provide fuel to the gas turbine continuously, and to a supplemental heater on the steam generator during night or low insolation periods. The syngas can also be water-shifted in a gas water shift reactor to produce an $H_2$ and $CO_2$ mixture, and the $CO_2$ can be separated in a chemical adsorption process as a means of capturing carbon.

These and other features of the present invention will become readily apparent upon further review of the following specification and drawings.

BRIEF DESCRIPTION OF THE DRAWINGS

The sole drawing FIGURE is a schematic diagram of an integrated solar-gas turbine cogeneration plant according to the present invention.

Similar reference characters denote corresponding features consistently throughout the attached drawings.

DETAILED DESCRIPTION OF THE PREFERRED EMBODIMENTS

The integrated solar-gas turbine cogeneration plant, generally referred to in the drawings by the reference number 10 and hereinafter referred to as "ISGTCGP," provides for more efficient production, operation, and economic operation of the ISGTCGP 10 by incorporating a fuel reformer 14 and solar energy sources for producing the necessary heat for the fuel reformer 14 and help steam production. Initially, it is noted that although valves are not explicitly mentioned, the description herein incorporates various valves and valve systems as is known in the art. In a production cycle, the ISGTCGP 10 utilizes solar energy to produce high quality fuel during sunlight availability via the fuel reformer 14 and utilizes the produced fuel during the periods of sunlight unavailability. Moreover, the processes involved in the fuel reformer 14 provide a means for utilizing captured carbon.

Referring to the drawing FIGURE, the ISGTCGP 10 uses methane as fuel, which is provided through the fuel intake 12. The methane is upgraded to a higher quality fuel, i.e., syngas, in the fuel reformer 14. The fuel reforming reaction of methane with water (the water being provided by steam from the heat recovery steam generator), $CH_4 + H_2O \rightarrow CO + 3H_2$ ($\Delta H_{298K} = +206$ kJ/mole), is an endothermic process. The reaction produces syngas with a higher heating value. The energy required for this reaction can be obtained using solar energy provided by a first solar collector 20. Thus, during the day, syngas fuel can be produced utilizing the available solar energy. A portion of the syngas can be stored in a fuel storage unit 18, while the remainder is passed to other parts of the ISGTCGP 10 for further processing, as will be described below.

The first solar collector 20 can be a solar tower 26, where solar energy is concentrated at a point on the tower 26 to heat a medium flowing therethrough. In this instance, the medium is air provided by an air intake 22 and passed through an air compressor 24. A portion of the heated air is directed to the fuel reformer 14 to provide the necessary heat for the endothermic reaction. The rest of the heated air is directed to a gas combustion chamber 28 to facilitate combustion of the syngas fuel supplied by the fuel storage unit 18. The higher heating value of the syngas results in a cleaner burn that does not produce as much pollutants, compared to methane alone. Moreover, this allows for constant air/fuel flow rates or increased gas flow rates for fixed combustor exit temperature. The exhaust from the gas combustion chamber 28 rotates the turbines in a gas turbine 30 downstream of the combustion chamber 28. An electric generator 32 is operatively connected to the gas turbine 30 and converts the energy from the turbine 30 into electricity.

The exhaust gas from the turbine 30 is directed to other parts of the ISGTCGP 10, one of which is the fuel reformer 14, and another being a heat recovery steam generator (HRSG) 60. The exhaust gas still retains much heat. By directing the exhaust gas to the fuel reformer 14, the excess heat in the exhaust gas can be used to facilitate the fuel reformer reaction. When the exhaust gas completes its cycle through the reformer 14, the exhaust gas is evacuated. Depending on the operational parameters dictated by regulation, the exhaust gas may need to be processed through scrubbers and the like to insure carbon monoxide and other pollutants fall well within recommended levels.

Another aspect of the ISGTCGP 10 is steam generation. As shown in the drawing, water is supplied from a water source 18 passing through a pump 42. A splitter 44 downstream of the pump 42 directs the water to a second solar collector 40 and to a feed water heater 46. The feed water heater 46 preheats the water prior to entering the HRSG 60, while the second solar collector 40 also heats the water, albeit to a much higher temperature than the feed water heater 46, via solar energy. The second solar collector 40 can be a solar array having a plurality of solar panels that heat a medium, e.g., water, passing therethrough.

The preheated water is further processed inside the HRSG 60 by flowing through an economizer or heat exchanger 54 and an evaporator 56. Prior to being heated by the superheater 58, the wet or saturated steam from the evaporator 56 is mixed with the wet steam from the second solar collector 40 at a mixer 50. The superheater 58 converts the wet steam into dry steam used for industrial processes, such as petrochemicals, fertilizers, sugar, and textiles. A part of the generated steam can also be redirected to the fuel reformer 14 to provide some of the necessary heat for the endothermic reaction. It is noted that the dry steam can also be used to power a steam turbine for generating additional energy or electricity. Any excess steam, pressure and/or temperature can be controlled through the temperature control 52.

As mentioned above, the exhaust gas from the gas turbine 30 provides much of the heat required to boil the water into at least wet steam. However, nighttime or periods of low insolation may require more heat to be introduced into the HRSG 60 due to the lack of heating benefits from the first and second solar collectors 20, 40. To compensate, the HRSG 60 includes a supplemental heater or duct burner 34. The stored syngas in the fuel storage 16 fuels the supplemental heater 34.

Preferably, the fuel reformer 14 is configured to produce more syngas than that required for daylight operation. In addition to the uses already mentioned, the stored syngas is directed to a gas-water shift reactor 48 where it is water shifted to produce $CO_2$ and more $H_2$ according to the reaction $CO+H_2O \rightarrow CO_2+H_2$ ($\Delta H_{298K} = -41$ kJ/mole). The produced mixture of $CO_2$ and $H_2$ can be stored for use during the unavailability of solar energy at night to run the gas turbine 30 and/or the duct burner 34. Additionally, the energy from this reaction can be used to heat the feed water heater 46. The mixture can also be separated by chemical adsorption process, and the $H_2$ and $CO_2$ can be stored separately for further use. This provides an easy and economic method for $CO_2$ capturing.

It is to be understood that the present invention is not limited to the embodiments described above, but encompasses any and all embodiments within the scope of the following claims.

We claim:

1. An integrated solar-gas turbine cogeneration plant (ISGTCGP), comprising:
   a first solar collector and a second solar collector;
   a gas combustion chamber connected to the first solar collector, the first solar collector preheating air for efficient combustion of fuel being fed into the gas combustion chamber;
   a gas turbine disposed downstream of and connected to the gas combustion chamber, the gas turbine being rotated by exhaust from the gas combustion chamber;
   an electric generator operatively attached to the gas turbine, the electric generator producing electric power;
   a fuel reformer having an inlet for a source of feed fuel and a plurality of outlets, the fuel reformer producing syngas through a reforming reaction to be selectively distributed through the outlets, the first solar collector being operatively connected to the reformer in order to provide heat for the reforming reaction, the gas turbine having a line connected to the fuel reformer to provide heated exhaust gas heat for the reforming reaction;
   a fuel storage unit connected to one of the outlets on the fuel reformer, the fuel storage storing syngas produced by the reformer and selectively distributing syngas to parts of the ISGTCGP; and
   a heat recovery steam generator (HRSG) operatively connected to a source of feed water and to the second solar collector, the HRSG producing steam to be used in other processes, the HRSG having a line connected to the fuel reformer to provide heat and water for the reforming reaction, the second solar collector heating feed water to produce steam, the gas turbine having a line connected to the HRSG to provide heated exhaust gas, thereby boiling water inside the HRSG.

2. The integrated solar-gas turbine cogeneration plant according to claim 1, further comprising a supplemental heater attached to said HRSG, said fuel storage being connected to said supplemental heater to provide syngas for supplemental firing, said supplemental heater providing additional heat during night and low insolation periods.

3. The integrated solar-gas turbine cogeneration plant according to claim 1, further comprising a gas water shift reactor connected to said fuel storage for converting syngas into a mixture of $CO_2$ and $H_2$ via a chemical reaction, the chemical reaction producing heat.

4. The integrated solar-gas turbine cogeneration plant according to claim 3, further comprising a feed water heater disposed between said feed water source and said gas water shift reactor, said feed water heater preheating feed water prior to introduction into said heat recovery steam generator, the heat from said gas water shift reactor providing additional heat for preheating.

5. The integrated solar-gas turbine cogeneration plant according to claim 1, wherein said heat recovery steam generator comprises an economizer, an evaporator and a superheater disposed in series inside said heat recovery steam generator.

6. The integrated solar-gas turbine cogeneration plant according to claim 5, further comprising a mixer disposed between said superheater and said second solar collector, the mixer mixing wet steam from said evaporator and said second solar collector prior to being introduced to said superheater, said superheater converting the wet steam into dry steam.

* * * * *